US007039256B2

(12) United States Patent
Zlotnick et al.

(10) Patent No.: US 7,039,256 B2
(45) Date of Patent: May 2, 2006

(54) EFFICIENT VERIFICATION OF RECOGNITION RESULTS

(75) Inventors: Aviad Zlotnick, Mitzpe Netofa (IL); Svetlana Shukevich, Yokneam (IL)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 10/191,035

(22) Filed: Jul. 3, 2002

(65) Prior Publication Data

US 2003/0012460 A1    Jan. 16, 2003

Related U.S. Application Data

(63) Continuation-in-part of application No. 09/902,733, filed on Jul. 12, 2001.

(51) Int. Cl.
G06K 9/03    (2006.01)

(52) U.S. Cl. ............... 382/311; 382/225; 382/228; 715/526; 715/754

(58) Field of Classification Search ............. 345/157, 345/161, 163, 167, 173, 179, 180, 764, 773, 345/780, 11, 33; 382/119, 177, 187, 188, 382/189, 309, 311, 313, 314, 315, 317, 321, 382/225, 228; 715/505, 506, 507, 509, 529, 715/526, 754

See application file for complete search history.

(56) References Cited

U.S. PATENT DOCUMENTS

| | | | | |
|---|---|---|---|---|
| 5,315,667 A | * | 5/1994 | Fujisaki et al. | 382/187 |
| 5,455,875 A | | 10/1995 | Chevion et al. | |
| 5,455,901 A | * | 10/1995 | Friend et al. | 715/507 |
| 5,544,260 A | * | 8/1996 | Chefalas et al. | 382/187 |
| 5,566,248 A | * | 10/1996 | Ulrich | 382/187 |
| 5,666,490 A | * | 9/1997 | Gillings et al. | 709/238 |
| 5,677,710 A | * | 10/1997 | Thompson-Rohrlich | 345/173 |
| 5,682,439 A | * | 10/1997 | Beernink et al. | 382/187 |
| 5,717,794 A | * | 2/1998 | Koga et al. | 382/309 |
| 5,721,940 A | * | 2/1998 | Luther et al. | 715/506 |
| 5,732,152 A | * | 3/1998 | Sakai et al. | 382/189 |
| 5,852,685 A | | 12/1998 | Shepard | |
| 5,881,381 A | * | 3/1999 | Yamashita et al. | 715/509 |
| 5,950,190 A | * | 9/1999 | Yeager et al. | 707/3 |
| 6,167,411 A | * | 12/2000 | Narayanaswamy | 715/541 |
| 6,282,315 B1 | * | 8/2001 | Boyer | 382/177 |
| 6,351,574 B1 | * | 2/2002 | Yair et al. | 382/321 |
| 6,389,178 B1 | * | 5/2002 | Agazzi et al. | 382/276 |
| 6,393,138 B1 | * | 5/2002 | Chai | 382/119 |
| 6,487,311 B1 | * | 11/2002 | Gal et al. | 382/225 |
| 6,647,156 B1 | * | 11/2003 | Meding | 382/305 |
| 6,650,346 B1 | * | 11/2003 | Jaeger et al. | 345/764 |
| 6,654,031 B1 | * | 11/2003 | Ito et al. | 345/723 |
| 6,658,622 B1 | * | 12/2003 | Aiken et al. | 715/507 |
| 6,694,059 B1 | * | 2/2004 | Zlotnick | 382/228 |
| 6,727,917 B1 | * | 4/2004 | Chew et al. | 345/765 |
| 6,760,490 B1 | * | 7/2004 | Zlotnick | 382/311 |
| 6,760,755 B1 | * | 7/2004 | Brackett | 709/214 |

\* cited by examiner

Primary Examiner—Bhavesh M. Mehta
Assistant Examiner—Gregory Desire
(74) Attorney, Agent, or Firm—Stephen C. Kaufman (57) ABSTRACT

A method for increasing efficiency of interaction by an operator with data on a computer display includes presenting the data to the operator on the computer display, and providing multiple instances of an on-screen control at different locations on the display for selection by the operator using a pointing device linked to the display. The control is actuated responsive to the selection by the operator of any of the instances of the control on the display.

3 Claims, 5 Drawing Sheets

EFFICIENT VERIFICATION OF RECOGNITION RESULTS

CROSS-REFERENCE TO RELATED APPLICATION

This application is a continuation-in-part of U.S. patent application Ser. No. 09/902,733, filed Jul. 12, 2001, which is incorporated herein by reference.

FIELD OF THE INVENTION

The present invention relates generally to data encoding and specifically to methods and apparatus for improving the efficiency of data input to a computer.

BACKGROUND OF THE INVENTION

There are many applications for data input from a hard copy to a computer system that use automated Optical Character Recognition (OCR), followed by manual verification of the OCR results. Often, the computer that performs the OCR also generates a confidence rating for its reading of each character or group of characters. For example, Prime OCR™ software (produced by Prime Recognition Inc., Woodinville, Wash.) gives each character that it recognizes a confidence rating between 1 and 9. According to the manufacturer, results with confidence levels above 6 can usually be considered accurate. Human operators perform the verification step, either by reviewing all the fields in the original document, and correcting errors and rejects discovered in the OCR results, or by viewing and correcting only the characters or fields that have a low OCR confidence level.

There are methods known in the art for improving the reliability of the verification step. For example, U.S. Pat. No. 5,455,875, to Chevion et al., whose disclosure is incorporated herein by reference, describes a method for organizing data on a computer screen so as to improve productivity of human operators in verifying OCR results. The method is implemented in document processing systems produced by IBM Corporation (Armonk, N.Y.), in which the method is referred to as "SmartKey."

SmartKey works by presenting to the human operator a "carpet" of character images on the screen of a verification terminal. The character images are taken by segmenting the original document images that were processed by OCR. Segmented characters from multiple documents are sorted according to the codes assigned to them by the OCR. The character images are then grouped and presented in the carpet according to their assigned code. Thus, for example, the operator might be presented with a carpet of characters that the OCR has identified as representing the letter "a." Under these conditions, it is relatively easy for the operator to visually identify OCR errors, such as a handwritten "o" that was erroneously identified as an "a." The operator marks erroneous characters by clicking on them with a mouse, and then typically presses a "done" or "enter" button.

The displaying of composite, "carpet" images to the operator, made up entirely of characters which have been recognized by the OCR logic as being of the same type, enables errors to be rapidly recognized and marked on an exception basis. Once recognized, these errors can then be corrected either immediately or sent to another operator for correction, along with characters rejected by the OCR logic. The remaining, unmarked characters in the carpet are considered to have been verified.

U.S. Pat. No. 5,852,685, to Shepard, whose disclosure is incorporated herein by reference, similarly describes a method for enhanced batched character image processing. Character images are presented to an operator for verification in groups that are sorted to have the same recognized identities. To check the accuracy of the results, a number of images of purposely-incorrectly-identified characters (bogus errors) are included with the groups of character images to be verified. At the end of processing a batch of documents, the results of verification are examined to determine how many bogus errors were caught by the operator.

SUMMARY OF THE INVENTION

Even in productivity-enhancing verification systems, such as SmartKey, there is a built-in inefficiency, in that it has been found to take the operator around 30–50% of the total verification time to move the cursor in between the characters and the "done" button. Preferred embodiments of the present invention provide methods and systems for overcoming this inefficiency, thus increasing the speed of verification of coding of information, particularly coding of characters in form documents by OCR.

In some preferred embodiments of the present invention, a system for verification of coding of information is provided, wherein multiple "done" or "enter" buttons appear on the computer screen at different locations. The distance on the screen between an image of an item to be verified and the nearest button is thus significantly reduced. The "done" buttons are preferably interspersed between or around the items for verification. For example, in the particular case of processing SmartKey carpets, the "done" buttons are preferably incorporated into the grid of fields containing individual characters to be verified. In one embodiment, when the operator marks a character as erroneous, the "done" button then appears alongside the character. Thus, the operator need make only a small movement of a mouse or other user interface device in order to bring the cursor to the nearest "done" button. Clicking on any such button indicates that the operator's interaction with this screen is completed.

Although preferred embodiments described herein relate specifically to placement of a "done" or "enter" button for use in data verification, the principles of the present invention are equally applicable to on-screen controls and user tasks of other types. Those skilled in the art will appreciate that duplication of such controls at multiple locations on the computer screen can enhance the speed and efficiency of data processing in a variety of applications. Although particular types, arrangements and locations of on-screen controls are described herein by way of example, alternative arrangements will be apparent to those skilled in the art, depending on the specific workflow pattern of a given system. For example, a system comprising multiple buttons on a display screen can be used for data entry/input. Each time an operator finishes inputting data in one field, he presses the nearest "done" button. This, saves much time in data entry. Similarly, in optical inspection systems, the multiple buttons on the display screen can be used to accept or reject an inspected item.

In further preferred embodiments of the present invention, characters with a low OCR confidence level are included in carpets of characters with higher confidence levels in order to test the alertness and diligence of operators. A disadvantage of inserting characters that are purposely incorrect, as proposed in the above-mentioned U.S. Pat. No. 5,852,685, is that the intentional errors tend to stand out so strongly that they are easy for the operators to learn to recognize, and may actually distract the operators from subtler, inadvertent OCR errors. Low-confidence characters must generally be marked by the operator even if they are correct, because the operator cannot be sure of their classification. This use of low-confidence characters thus provides operator performance enhancement, as well as a better statistical indication of operator performance than do other methods known in the art.

There is therefore provided, in accordance with a preferred embodiment of the present invention, a method for increasing efficiency of interaction by an operator with data on a computer display, including:

presenting the data to the operator on the computer display;

providing multiple instances of an on-screen control at different locations on the display for selection by the operator using a pointing device linked to the display; and actuating the control responsive to the selection by the operator of any of the instances of the control on the display.

Preferably, actuating the control includes receiving an indication from the operator that the data are verified. In a preferred embodiment, presenting the data includes presenting results of optical character recognition (OCR) for verification by the operator.

Preferably, presenting the data includes presenting the data in a plurality of data fields on the display, and providing the multiple instances includes placing the instances of the control in proximity to different ones of the fields. Typically, the selection of the on-screen control indicates that the operator has finished processing the data in the plurality of the fields, and the method includes refreshing the display so as to present a new set of the data responsive to actuation of the control, the refreshed display including at least one new instance of the on-screen control, with a cursor controlled by the pointing device pointing to the at least one new instance. Additionally or alternatively, placing the instances includes interspersing the instances of the control between the data fields.

Preferably, providing the multiple instances includes choosing the locations so as to minimize a traverse of the pointing device required to select one of the instances. Most preferably, choosing the locations includes receiving an input from the operator indicating one of the fields, and placing one of the instances in a vicinity of the indicated one of the fields responsive to the input.

In a preferred embodiment, presenting the data includes displaying in the fields characters from a document to which codes have been assigned so that the operator can verify that the assigned codes are correct. Typically, displaying the characters includes displaying results of optical character recognition (OCR) processing. Preferably, displaying the results includes displaying together a plurality of the characters which have been assigned the same code by the OCR processing, with one of the characters in each of the fields.

Most preferably, providing the multiple instances includes providing three or more instances of the control on screen.

There is also provided, in accordance with a preferred embodiment of the present invention, apparatus for operator interaction with a computer, including:

a display, arranged to present data to an operator;

a processor, coupled to drive the display to present the data together with multiple instances of an on-screen control at different locations on the display; and a user interface device, coupled to the processor so as to enable the operator to select for actuation any of the instances of the on-screen control by the operator.

Preferably, the user interface device includes a mouse.

There is additionally provided, in accordance with a preferred embodiment of the present invention, a computer software product for increasing efficiency of interaction of an operator with data on a computer display, including a computer-readable medium in which program instructions are stored, which instructions, when read by a computer, cause the computer to present the data to the operator on the computer display while providing multiple instances of an on-screen control at different locations on the display for selection by the operator using a user interface device linked to the display, and to actuate the control responsive to the selection by the operator of any of the instances of the control on the display.

There is further provided, in accordance with a preferred embodiment of the present invention, a method for increasing efficiency of interaction by an operator with data on a computer display, including:

presenting the data to the operator in a plurality of data fields on the computer display;

receiving an input from the operator indicating a field among the plurality of data fields using a user interface device linked to the display;

responsive to the input, displaying an on-screen control in a vicinity of the indicated field, for selection by the operator using the user interface device; and actuating the control responsive to the selection of the control by the operator.

Typically, actuating the control includes receiving an indication from the operator that the data have been verified, wherein receiving the input includes marking the indicated field to identify the data in the field as suspect.

Preferably, displaying the on-screen control includes displaying the control within an area on the display occupied by the indicated field. Alternatively, displaying the on-screen control includes displaying the control in a location adjacent to but not overlapping with a cursor controlled by the user interface device.

There is moreover provided, in accordance with a preferred embodiment of the present invention, a method for automated identification, including:

receiving a collection of input items;

assigning respective classifications to the items in the collection, the classifications of the items having respective confidence attributes associated therewith;

forming a group of the items whose respective classifications are the same, with respective confidence attributes in a first attribute range;

adding to the group a selection of the items for which the confidence attributes associated with the respective classifications are in a second attribute range, such that the classifications whose confidence attributes are in the second attribute range are likelier to be erroneous than those whose confidence attributes are in the first attribute range;

presenting the group of the items together on a computer display; and receiving an input from an operator indicating the items on the display whose classifications are perceived by the operator to be erroneous.

Typically, the confidence attributes include confidence levels, and forming the group includes including in the group the items whose respective confidence levels are in excess of a predetermined threshold, while the items in the selection added to the group have respective confidence levels below the predetermined threshold.

Preferably, the method includes evaluating the input from the operator with respect to the items in the group for which the confidence levels are in the second attribute range, so as to assess performance of the operator in verifying the classifications of the items for which the confidence levels are in the first attribute range. In a preferred embodiment, evaluating the input includes comparing a statistical distribution of the classifications for which the confidence attributes are in the second attribute range to a number of the items indicated by the operator to be erroneous.

Preferably, presenting the group includes presenting the items side-by-side in a plurality of data fields on the display, and receiving the input includes receiving a selection of one or more of the fields made by the operator using a user interface device.

Preferably, adding the selection of the items to the group includes selecting the items to be added such that the classifications of the added items are the same as the classifications of the items in the group whose respective confidence attributes are in the first attribute range. In a preferred embodiment, assigning the respective classifications includes assigning first and second classifications to each of at least some of the items, with respective first and second confidence attributes, such that the first confidence attribute is indicative of a higher level of confidence than the second confidence attribute, and selecting the items to be added includes selecting the items such that the second classification of the added items is the same as the classifications of the items in the group whose respective confidence attributes are in the first attribute range.

Alternatively, adding the selection of the items to the group includes selecting the items to be added such that the classifications of the added items are different from the classifications of the items in the group whose respective confidence attributes are in the first attribute range.

There is furthermore provided, in accordance with a preferred embodiment of the present invention, apparatus for operator interaction with a computer, including:

a display, arranged to present data to the operator in a plurality of data fields;

a user interface device, coupled to the display so as to enable the operator to provide an input indicating a field among the plurality of data fields; and a processor, coupled to drive the display to present the data and to receive the input from the user interface device and arranged, responsive to the input, to cause an on-screen control to be displayed in a vicinity of the indicated field, for selection by the operator using the user interface device, and to actuate the control responsive to the selection of the control by the operator.

There is also provided, in accordance with a preferred embodiment of the present invention, apparatus for automated identification of a collection of items, including:

a display, arranged to present the items to an operator;

a user interface device, coupled to the display so as to enable the operator to provide an input selecting one or more of the items on the display; and a processor, which is arranged to assign respective classifications to the items in the collection, the classifications of the items having respective confidence attributes associated therewith, the processor being further arranged to form a group of the items whose respective classifications are the same, with respective confidence attributes in a first attribute range, and to add to the group a selection of the items for which the confidence levels associated with the respective classifications are in a second attribute range, such that the classifications whose confidence attributes are in the second attribute range are likelier to be erroneous than those whose confidence attributes are in the first attribute range, and to drive the display to present the group of the items together so as to receive the input from the operator to indicate the items whose classifications are perceived by the operator to be erroneous.

There is additionally provided, in accordance with a preferred embodiment of the present invention, a computer software product, including a computer-readable medium in which program instructions are stored, which instructions, when read by a computer, cause the computer to drive a display so as to present data to an operator in a plurality of data fields, and to receive an input made by an operator using a user interface device to indicate a field among the plurality of data fields, and responsive to the input, to cause an on-screen control to be displayed in a vicinity of the indicated field for selection by the operator using the user interface device, and to actuate the control responsive to the selection of the control by the operator.

There is further provided, in accordance with a preferred embodiment of the present invention, a computer software product for automated identification of a collection of items, the product including a computer-readable medium in which program instructions are stored, which instructions, when read by a computer, cause the computer to drive a display so as to present the items to an operator, and to receive an input made by the operator selecting one or more of the items on the display, the instructions further causing the computer to assign respective classifications to the items in the collection, the classifications of the items having respective confidence attributes associated therewith, and to form a group of the items whose respective classifications are the same, with respective confidence in a first attribute range, and to add to the group a selection of the items for which the confidence levels associated with the respective classifications are in a second attribute range, such that the classifications whose confidence attributes are in the second attribute range are likelier to be erroneous than those whose confidence attributes are in the first attribute range, the instructions further causing the computer to drive the display to present the group of the items together so as to receive the input from the operator to indicate the items whose classifications are perceived by the operator to be erroneous.

The present invention will be more fully understood from the following detailed description of the preferred embodiments thereof, taken together with the drawings in which:

DETAILED DESCRIPTION OF PREFERRED EMBODIMENTS

Figure 1:
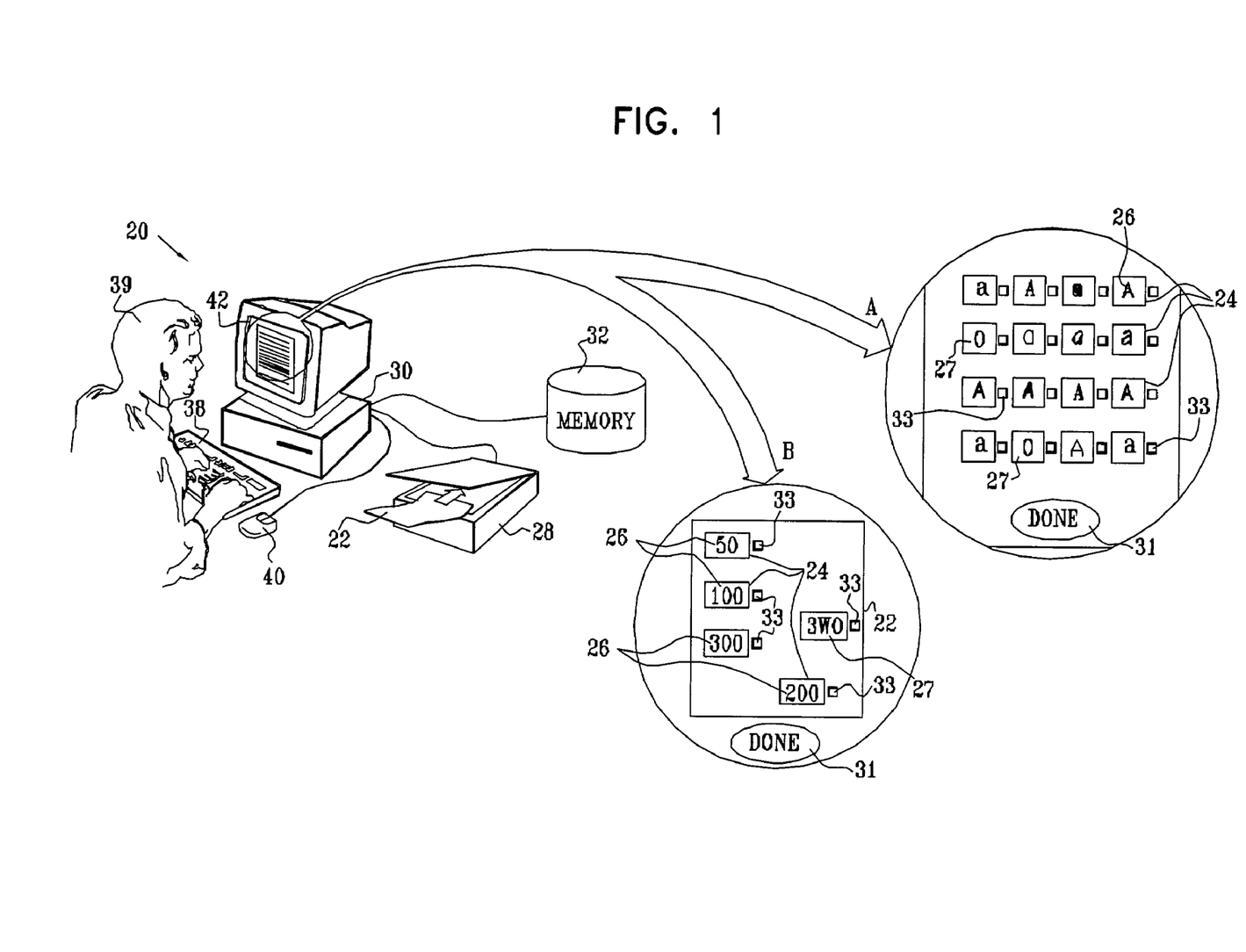
FIG. 1 is a simplified pictorial illustration showing a system for verification of coding of information, in accordance with a preferred embodiment of the present invention.

FIG. 1 is a simplified pictorial illustration showing a system 20 for verification of coding of information, in accordance with a preferred embodiment of the present invention. System 20 receives a document 22 for extraction of information therefrom. The document preferably comprises a preprinted form having fields 24 that are filled in with handwritten, typed or printed contents 26. The contents typically comprise alphanumeric characters, although they may comprise symbols or marks of other types, generated by hand or by machine.

A scanner 28 first captures an image of document 22 and conveys the corresponding image data to a document processor 30, typically comprising a suitable general-purpose computer. In order to extract information from document 22, system 20 performs OCR on the image data, and thus assigns a code (such as an ASCII code) to each character. Alternatively, the document is input to the processor from another source, typically in electronic form, either as a document image or as characters keyed in by an operator. Further alternatively, although the methods described hereinbelow are applied specifically to verification of OCR characters, the principles of these methods are applicable to verification of data coding of substantially any type.

The OCR and verification functions of processor 30 (typically together with other document processing functions) are preferably performed using software running on processor 30. The software may be supplied on tangible media, such as diskettes or CD-ROM, and loaded into the processor. Alternatively, the software may be downloaded to the processor via a network connection or other electronic link. Further alternatively, processor 30 may comprises dedicated, hard-wired elements or a digital signal processor designed to carry out some or all of the processing functions.

Typically, processors 30 retrieves items from memory 32 and presents them on a screen 42 for verification by an operator 39. An item may be an alphanumeric character, a symbol or any other object requiring verification. More typically, the items are characters all having the same code, and requiring operator verification, as in the IBM SmartKey system, described in the Background of the Invention. Processor 30 typically allows the operator to process a screen full of items.

Operator 39 views multiple items simultaneously on screen 42, and identifies any anomalous item appearing on the screen. In the example of FIG. 1, as shown in the inset at upper right, the operator views a SmartKey "carpet" of characters 26, all of which were coded by processor 30 (or by another processor or operator) as representing the letter "A". The carpet is also seen to include a number of anomalous characters 27, which were evidently miscoded. The operator typically marks anomalous items 27 by clicking a mouse 40 on these items. Alternatively, the operator may use a pointing device of another type, such as a joystick, trackball or other devices known in the art. As is exemplified in FIG. 1, inset A, the operator has to identify and mark anomalous letters "o" that appear in the carpet of "A"s. For each field 24, there is typically a proximal "field done" button 33 on which he clicks his mouse 40 having identified and marked the anomalous character 27.

When the operator has corrected all the anomalous letters "o", he clicks mouse 40 either on one of "done" buttons 33 or a "done" button 31 at the bottom of the screen. This is indicative that all of the characters on the screen have been verified by operator 39. Alternatively, the operator may press certain buttons on a keyboard 38, such as "TAB" and/or "ENTER," for this purpose. At this point the screen is considered to have been verified, with the exception of the marked anomalous items 27. By selecting a "done" button 33 that is adjacent to the last character 27 that he has marked, rather than selecting button 31 or pressing the "enter" key, the operator avoids a long traverse of mouse 40 and thus shortens the time needed to complete screen 42 and move on to the next one. The distance between at least one of the control buttons and any one of the data fields is preferably configured so as to optimize the tradeoff between throughput lost due to reducing the data area on screen, and throughput gained by reducing time spent by the operator on control actions. The anomalous items marked by the operator are sent for further processing.

Alternatively, as shown in the lower inset B, operator 39 may be required to verify and/or correct fields 24 comprising numerical characters 26 on a screen of numerical characters. The letter W in the string "3W0" stands out as being an anomalous item 27. In this case, the operator has to identify, mark and possibly correct anomalous item 27 "3W0". If there are no more anomalous items 27, he clicks mouse 40 on a "field done" button 33 or on "screen done" button 31 so as to show that all items on screen designated B have been verified, with the exception of "3W0".

Figure 2A:
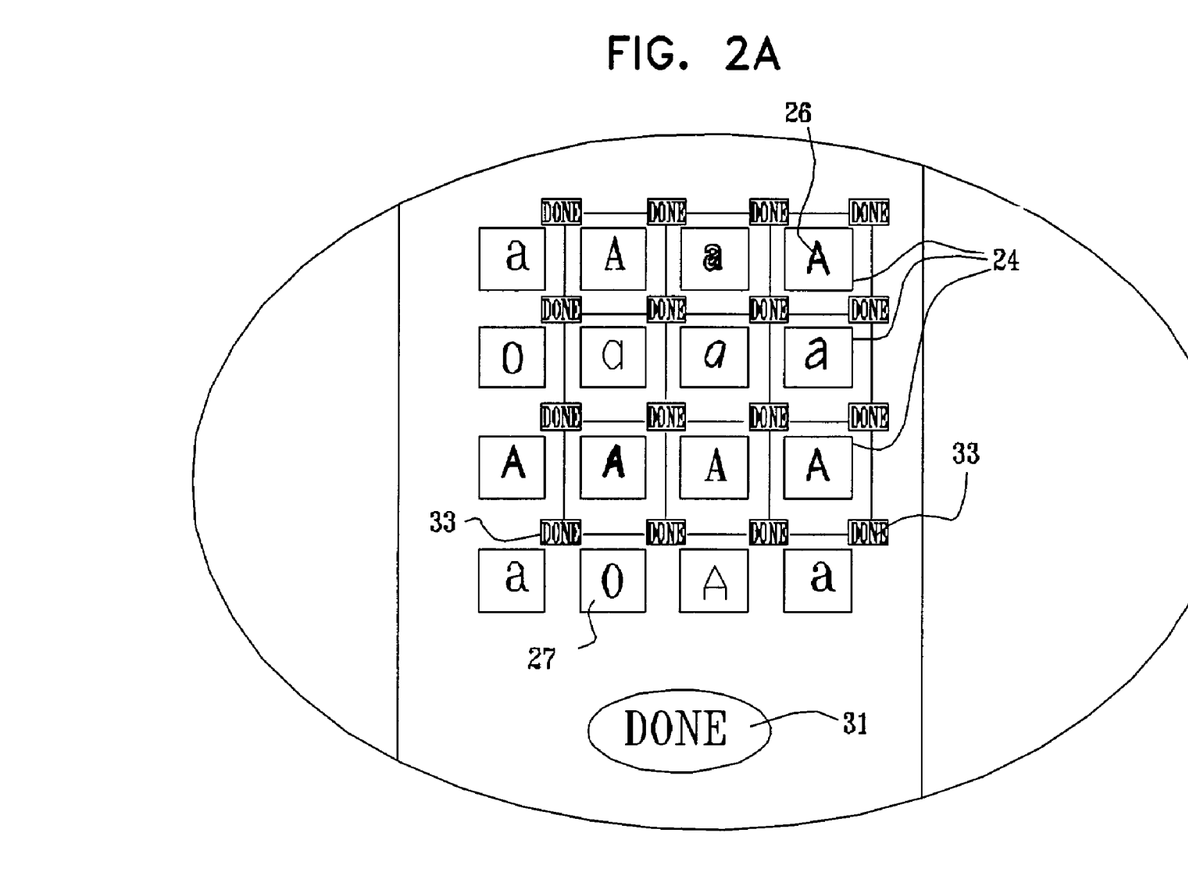
FIGS. 2A and 2B are simplified pictorial illustrations of a computer screen arranged for verification of coding of information, in accordance with a preferred embodiment of the present invention.
Figure 2B:
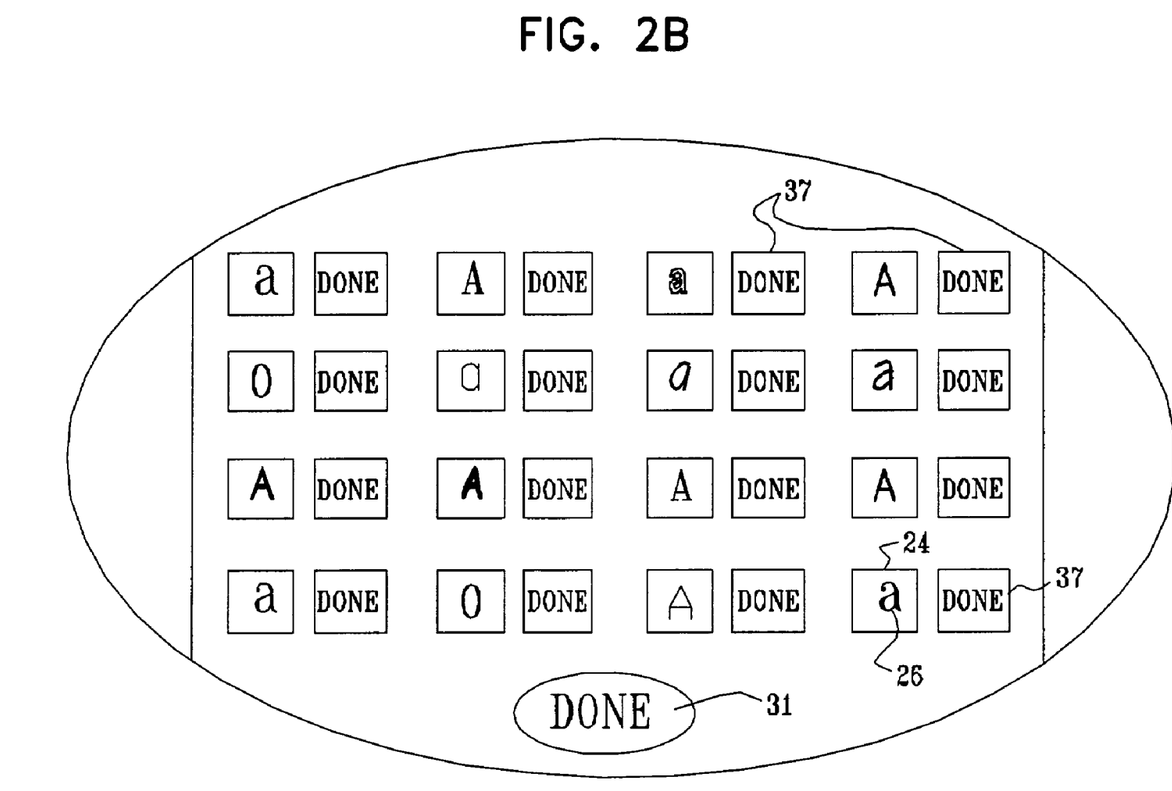

Reference is now made to FIGS. 2A and 2B, which are simplified pictorial illustrations of screen 42, arranged for verification of coding of information with improved efficiency, in accordance with a preferred embodiment of the present invention.

FIG. 2A shows a multiplicity of "done" buttons 33 proximal, but external to fields 24. These buttons 33 sit on a grid interspersed between fields 24. The grid may be arranged such that the buttons 33 are placed above and below, or in between fields 24.

FIG. 2B shows an alternative arrangement of "done" buttons, in which "done" buttons 37 are placed within some of fields 24. In this example, there is one "done" button 37 per field 24. This placement enables the operator to reach the nearest "done" button by a quick, simple left or right movement of mouse 40.

Figure 3A:
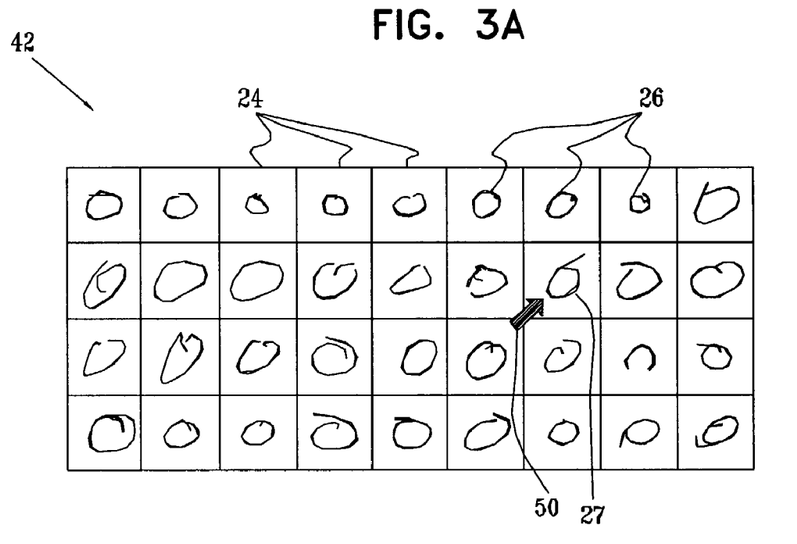
FIGS. 3A and 3B are simplified pictorial illustrations of a computer screen arranged for verification of coding of information, in accordance with another preferred embodiment of the present invention.
Figure 3B:
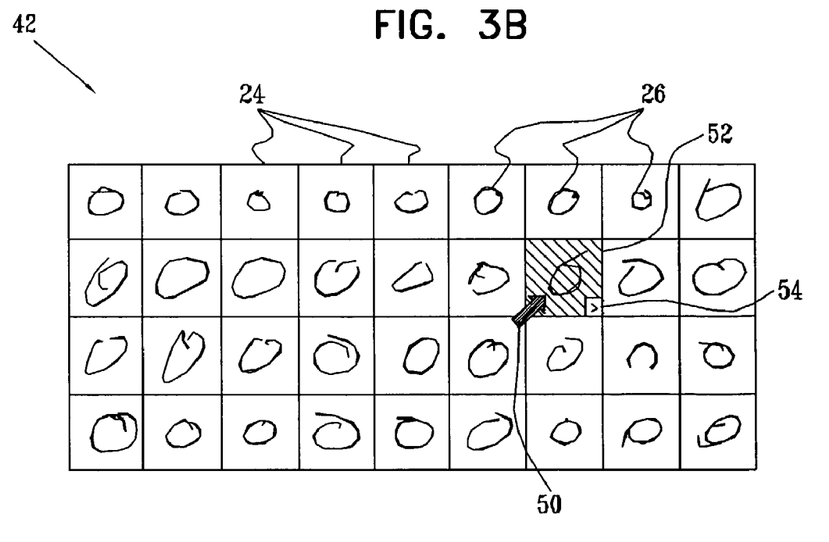

FIGS. 3A and 3B are simplified pictorial illustrations of screen 42, in accordance with another preferred embodiment of the present invention. As shown in FIG. 3A, operator 39 is presented with a carpet of characters 26 that were classified by processor 30 as zeros, including one anomalous item 27, which may be a six. Operator uses mouse 40 to bring a cursor 50 into the field 24 that contains item 27, and clicks a mouse button in order to mark the anomalous item as a possible OCR error. Alternatively, the operator may use some other user interface device for this purpose, such as keyboard 38, or substantially any other type of pointing device known in the art.

As shown in FIG. 3B, when the operator clicks on item 27, the field containing the item is preferably highlighted with a marking pattern 52, and a "done" button 54 appears in or adjacent to the field. With only a small movement of the mouse, operator 39 can position cursor 50 over button 54, and can then click on the button to dismiss the screen. Preferably, button 54 is positioned (as shown in FIG. 3B) so that cursor 50 is near the button, but not overlapping it, in order to avoid the possibility of erroneously dismissing the screen if the operator inadvertently double-clicks on the mouse. If operator 39 chooses not to dismiss the screen, but rather marks an additional character, a new button 54 appears in or adjacent to the next character that is marked. Any previous button 54 may be removed from the screen when the operator marks a new character.

Note that if characters 26 are too small and close together, displaying button 54 in the manner shown in FIG. 3B may cause the button to overlap another one of the characters. Such overlap is undesirable, as it may lead the operator to miss an error in the overlapped character. Therefore, in such a case, a separate "done" button is preferably displayed, as shown in FIG. 2A or 2B, for example.

Preferably, regardless of the type and placement of "done" buttons on the screen, when the screen is dismissed and a new screen is displayed, cursor 50 is initially positioned over one of the "done" buttons on the new screen. Thus, if the operator sees that all of the characters on the screen are correctly identified, he can simply click on the mouse button to dismiss the new screen, without even moving the mouse.

Figure 4:
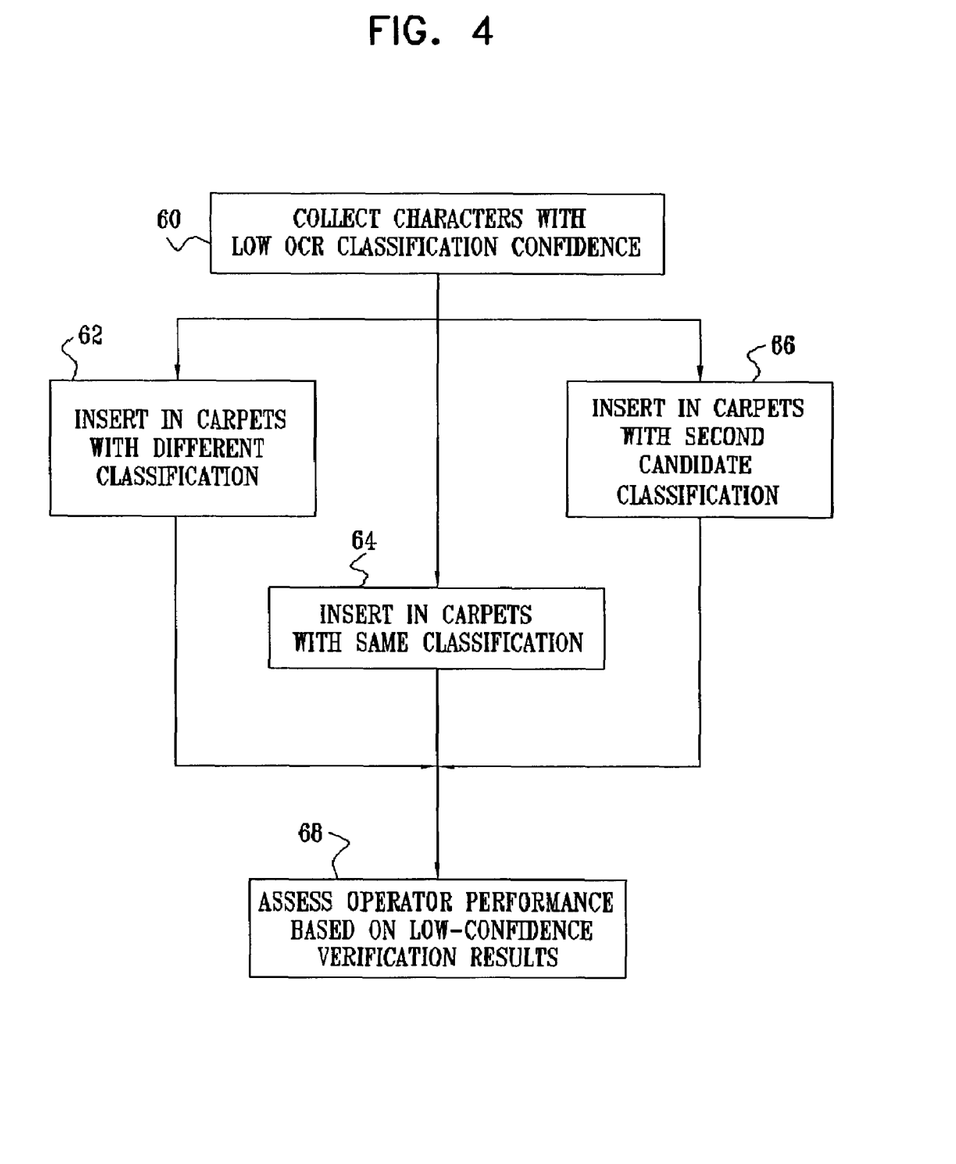
FIG. 4 is a flow chart that schematically illustrates a method for verification of information with operator performance assessment, in accordance with a preferred embodiment of the present invention.

FIG. 4 is a flow chart that schematically illustrates a method for assessing the performance of verification operators, such as operator 39, in accordance with a preferred embodiment of the present invention. Operators tend to lose their alertness if there are very few errors, such that most screens are dismissed with a single operator action, such as a (mouse click or keystroke. As a result, the operator may miss some of the few errors that do exist. It is possible to inject a set of wrongly-classified "trap" characters into the carpets (as suggested in the above-mentioned U.S. Pat. No. 5,852,685, for example). This approach is of limited utility, however, since operators learn the trap characters in a short time, and then mark only the trap characters and miss the real OCR errors. Even if the set of trap characters is too big to be learned, these characters are likely to be outstanding enough to mask the operator's perception of the real errors.

Therefore, in the present embodiment of the present invention, input characters whose OCR confidence level is low are injected into carpets of characters to be verified, in order to assess the operator's attention level. These low-confidence characters are collected in the normal course of OCR operations by processor 30, at a character collection step 60. Processor 30 assigns a classification to these characters, but with a level of confidence that is below some predetermined threshold. Typically, the confidence threshold is determined heuristically, such that "confident" results include no more than 1% errors in recognizing handwritten characters, and no more than 0.1% errors in recognizing printed characters. The confidence rating assigned by the OCR processor (such as the above-mentioned PrimeOCR software) may be used for this purpose, either by itself or together with other factors, such as a priori similarity of certain characters (O and D, for example). Some uncertain characters may receive two or more alternative candidate classifications, each with its respective confidence level. The "first candidate classification" refers to the assignment that has the highest confidence level, while the "second candidate classification" has the next-highest level, and so forth.

The low-confidence characters may then be used in a number of ways:

The low-confidence characters may be inserted into carpets of characters whose OCR classification is different from their own OCR classification, at a different carpet insertion step 62.

The low-confidence characters may be inserted into carpets having the same OCR classification as they do, at a same carpet insertion step 64. As a practical matter, characters that are classified by processor 30 with low OCR confidence almost always should be marked by operator 39. Even if the OCR classification of these characters is actually correct, the characters are usually sufficiently defective so that the operator cannot be certain of the classification just from viewing the isolated characters in the carpet. The low-confidence characters provide a particularly good test of the operator's attention level, since they are similar to the correct characters in the carpet (otherwise OCR would not have suggested them), and they are not repeated.

The low-confidence characters may be inserted into carpets whose OCR classification is the same as the second candidate classification of the low-confidence characters, at a second candidate insertion step 66.

The performance of operator 39 is then assessed on the basis of his having marked (or failed to mark) the low-confidence characters inserted in the carpets, at an assessment step 68. The count of unmarked low-confidence characters is an indication of operator performance. The count can also be used to evaluate the overall confidence of the verification results, and thus influence further processing. Statistics regarding the correctness of the OCR classification can be used for this purpose, as well: for example, if 20% of the second candidate classifications are actually correct, a good operator would be expected to mark about 80% of the low-confidence characters inserted in the carpets at step 66.

Separate and apart from the usefulness of the added low-confidence characters in assessing the performance of the operator, they are independently useful in enhancing the operator's performance of his job. For example, the addition of the low-confidence characters to the screens viewed by the operator may help to maintain the operator's, attention level and alertness.

Although the embodiments described above relate specifically to verification of OCR results, the principles of the present invention can be applied to enhance the efficiency of a wide variety of computerized data entry functions. In particular, the inventors have found that by duplication and strategic placement of on-screen controls (without limitation to controls of a specific type, such as "done" buttons), it is possible to reduce the time that an operator spends on interaction with a given screen. This sort of strategic duplication is not known in the prior art. The strategic placement of on-screen buttons may be particularly useful in data entry systems, for manually inputting information to a computer. In such applications, the user may be required to select fields on screen with a mouse, and then enter data into the selected fields. "Enter" buttons may be strategically placed at multiple locations on the screen to indicate that the user is finished processing the fields in this screen.

Another application of on-screen buttons is in inspection systems. For example, in a food processing line, the tradename of a food product may appear thereupon. Quality control of the product typically comprises inspection of a large number of items simultaneously using a computerized magnification system, as is known in the art. The quality control inspector checks that the appearance of the tradename is clear and legible on multiple items at a time. If the inspector finds an item with a defect in the appearance of the name, he points using pointing device (as in FIG. 1) to mark the item which is to be rejected from the product line, and then selects the nearest "done" button to indicate that the rest of the items are acceptable. Of course, such on-screen button systems can be applied to other types of inspection systems, such as manufacturing inspection systems for semiconductor chips, metal parts and the printing industry. Such systems can also be applied in medical diagnostics, wherein the operator might be required to view multiple cell images, for example, and to mark cells or other features belonging to a certain type or exhibiting some pathology.

Another exemplary application of the present invention is in the area of process or system control. In this case, the screen might contain multiple graphic illustrations or images, each indicative of the status or dynamics of a given process. The operator is required to mark processes that need special attention. A process in this sense may be a network activity, for example, and special attention may be required when the activity indicates a possible security problem. A single screen may be used in this manner for dynamic monitoring of multiple networks at once.

The methods described above for interspersing low-confidence computer recognition results in groups of images that an operator must verify may likewise be adapted for use in these different application areas.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for automated injection, comprising:
   receiving a collection of input items;
   assigning respective classifications to the items in the collection, the classifications of the items having respective confidence attributes associated therewith;
   forming a group of the items whose respective classifications are the same, with respective confidence attributes in a first attribute range;
   adding to the group a selection of the items for which the confidence attributes associated with the respective classifications are in a second attribute range, such that the classifications whose confidence attributes are in the second attribute range are likelier to be erroneous than those whose confidence attributes are in the first attribute range:
   presenting the group of the items together on a computer display; and
   receiving an input from an operator indicating the items on the display whose classifications are perceived by the operator to be erroneous,
   wherein adding the selection of the items to the group comprises selecting the items to be added such that the classifications of the added items are the same as the classifications of the items in the group whose respective confidence attributes are in the first attribute range, and
   wherein assigning the respective classifications comprises assigning first and second classifications to each of at least some of the items, with respective first and second confidence attributes, such that the first confidence attribute is indicative of a higher level of confidence than the second confidence attribute, and wherein selecting the items to be added comprises selecting the items such that the second classification of the added items is the same as the classifications of the items in the group whose respective confidence attributes are in the first attribute range.

2. An apparatus for automated injection of a collection of items, comprising:
   a display, arranged to present the items to an operator;
   a user interface device, coupled to the display so as to enable the operator to provide an input selecting one or more of the items on the display, wherein the items in the selection added to the group have the same classifications as the classifications of the items in the group whose respective confidence attributes are in the first attribute range; and
   a processor, which is arranged to assign respective classifications to the items in the collection, the classifications of the items having respective confidence attributes associated therewith.
   wherein the processor is arranged to form a group of the items whose respective classifications are the same, with respective confidence attributes in a first attribute range, and to add to the group a selection of the items for which the confidence levels associated with the respective classifications are in a second attribute range, such that the classifications whose confidence attributes are in the second attribute range are likelier to be erroneous than those whose confidence attributes are in the first attribute range, and to drive the display to present the group of the items together so as to receive the input from the operator to indicate the items whose classifications are perceived by the operator to be erroneous,
   and wherein the processor is further arranged to assign first and second classifications to each of at least some of the items, with respective first and second confidence attributes, such that the first confidence attribute is indicative of a higher level of confidence than the second confidence attribute, and wherein the items in the selection added to the group are such that the second classification of the hems in the selection is the same as the classifications of the items in the group whose respective confidence attributes are in the first attribute range.

3. A computer software product for automated injection of a collection of items, the product comprising a computer-readable medium in which program instructions are scored, which instructions, when read by a computer, cause the computer to drive a display so as to present the items to an operator, and to receive an input made by the operator selecting one or more of the items on the display, wherein the items in the selection added to the grow, have the same classifications as the classifications of the items in the group whose respective confidence attributes are in the first attribute range;
   the instructions further causing the computer to assign respective classifications to the items in the collection, the classifications of the items having respective confidence attributes associated therewith, and to form a group of the items whose respective classifications are the same, with respective confidence in a first attribute range, and to add to the group a selection of the items for which the confidence levels associated with the respective classifications are in a second attribute range, such that the classifications whose confidence attributes are in the second attribute range are likelier to be erroneous than those whose confidence attributes are in the first attribute range; and
   the instructions further causing the computer to drive the display to present the group of the items together so as to receive the input from the operator to indicate the items whose classifications are perceived by the operator to be erroneous.
   wherein the instructions cause the computer to assign first and second classifications to each of at least some of the items, with respective first and second confidence attributes, such that the first confidence attribute is indicative of a higher level of confidence than the second confidence attribute, and wherein the items in the selection added to the group are such that the second classification of the items in die selection is the same as the classifications of the items in the group whose respective confidence attributes are in the first attribute range.

* * * * *